Patented May 14, 1935

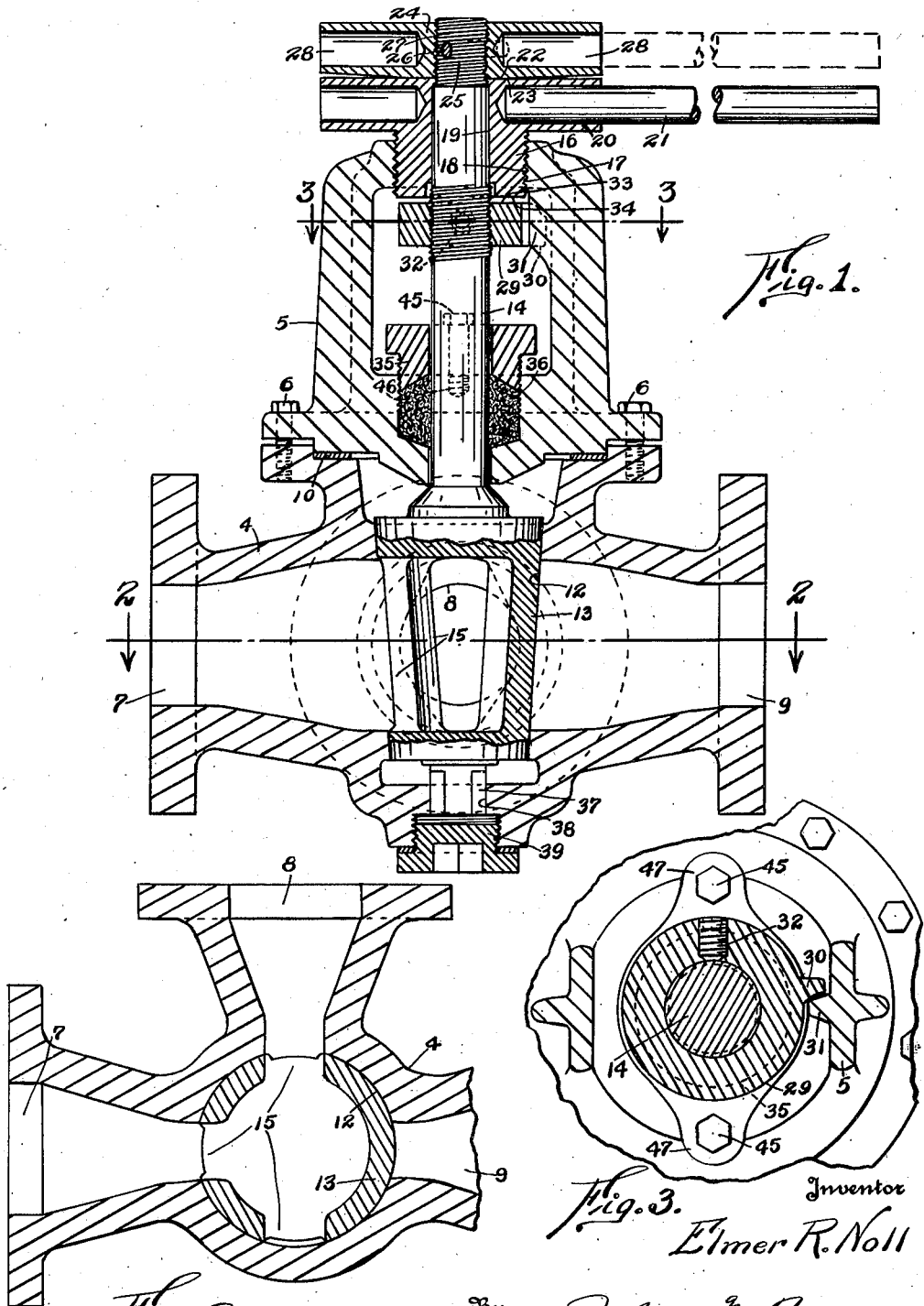

2,001,035

UNITED STATES PATENT OFFICE 2,001,035

VALVE

Elmer R. Noll, Cincinnati, Ohio, assignor to The William Powell Company, Cincinnati, Ohio, a corporation of Ohio Application February 9, 1932, Serial No. 591,847

2 Claims. (Cl. 251—97)

This invention relates to a valve of the tapered plug or key type, which is adapted for use in controlling high pressures of steam and other fluid.

An object of the invention is to provide a tapered key type of valve having means associated with the tapered key or plug whereby the key or plug may be unseated prior to rotation thereof to various operative and inoperative positions.

Another object is to provide a valve of the character referred to above, having a novel adjusting means for proper disposition for the openings in the tapered key relative to the ports of the valve housing.

Another object of the invention is to provide a high pressure valve which is quick acting, durable, and inexpensive of manufacture.

These and other objects are attained by the means described herein and disclosed in the accompanying drawing, in which:

Fig. 1 is a longitudinal cross-sectional view of a valve embodying the invention.

Fig. 2 is a cross-sectional view taken on line 2—2 of Fig. 1.

Fig. 3 is a cross-sectional view taken on the line 3—3 of Fig. 1.

The valve of the invention comprises a pair of housing members 4 and 5 which may be secured together by any suitable means such as the bolts 6, the housing member 4 being provided with two or more ports 7, 8, and 9. A leak-proof joint is provided by means of a gasket 10, where the housings are joined and held together by means of the bolts 6. The housing 4 has formed therein a tapered key or plug seat 12, in which is seated normally the tapered plug or key 13 which is formed upon or secured to the lower end of a valve stem 14. The tapered key is provided with the usual angularly disposed openings or ports 15 adapted to be placed into communication with the ports 7, 8 or 9 upon rotation of the valve stem and the tapered plug or key 13.

Any suitable means may be provided whereby the tapered plug 13 may be lifted slightly from its seat prior to rotation of the tapered key. Said means may conveniently comprise a sleeve 16 having threads 17 adapted to engage cooperative threads 18 formed in the top of the housing 5 axially thereof. The valve stem fits loosely within the bore 19 of the sleeve so as to provide for free rotation of the stem relative to the sleeve. Said sleeve is provided also with suitable means such as one or more drilled radial extensions 20 for reception of a suitable operating handle 21 whereby the sleeve may be rotated to the housing 5 and, by means of the threads 17—18, caused to move axially of the housing to raised and lowered positions.

Atop the sleeve 16 is provided an abutting surface 22 which is adapted to contact an abutting surface 23 on a suitable collar 24 which is rigidly secured to the upper end 25 of the valve stem. The collar may be locked in position by means of a suitable tapered pin 26, and the collar preferably is made adjustable along the valve stem by the provision of screw threads 27. In the preferred form of the device, the collar 24 is provided with one or more radial openings 28 for reception of the same operating handle 21 that cooperates with the openings in the extension 20 of sleeve 16.

From the foregoing, it should readily be apparent that upon rotation of the sleeve 16 by means of the operating handle 21 in one direction, for example the counterclockwise direction, the abutting surface 22 of the sleeve will engage the abutting surface 23 of the collar 24 whereby to force said collar upwardly with the result that the stem is elevated axially of the housing 5 for lifting the tapered plug or key 13 from its seat. After having been thereby lifted from its seat, the tapered plug may easily, and without undue wearing and scoring, be rotated for disposing the ports of the valve key in various positions relative to the ports of the housing 4. It is to be understood that the number of openings 15 in the valve key may be increased without departing from the spirit of the invention as disclosed herein.

A stop for limiting the rotational movement of the stem may be provided by means of a collar 29 having a stop lug 30 thereon adapted to strike a stationary stop lug 31 supported by the housing 5, the collar 29 being mounted upon the stem 14 for axial and rotational adjustment, by any suitable means such as a set screw 32. The said collar has a top abutting surface 33 adapted to engage a lower abutting surface 34 on the sleeve 16 when the sleeve is moved to its lowered position, whereby the stem and its tapered plug 13 are forced downwardly in a positive manner for tightly seating the tapered key or plug upon the seat 12 of the housing 4. It is readily evident, therefore, that the means above described provide for positive lifting and positive seating of the tapered key relative to the seat of the housing 4, the positive seating being effected for the purpose of precluding leakage of fluid at the valve seats, and the positive unseating serving to relieve the seats of undue friction while the tapered key is being rotated for changing the location of the ports of the tapered key relative to the ports of the valve housing.

In order to preclude leakage of fluid upwardly past the stem, there is provided a suitable gland 35 snugly surrounding the valve stem and held in position by any suitable means such as bolts or the like 45, engaging threaded openings 46 in housing 5, for applying pressure to the packing material 36 located in said housing below the gland 35. The bolts 45 may pass through perforated ears 47 which extend from member 35, (Fig. 3). The tapered key 13 may be integral with the stem 14, or it may be fixedly secured thereto, as desired.

In order to insure proper seating of the valve key, the lower end thereof is provided with a pilot 37 formed concentrically with the axis of the valve stem and received in a circular opening or guide 38 formed in the housing member 4. The pilot is of such length that it will not leave the opening 38 upon movement of the stem to the elevated position, thereby maintaining the valve key always in a concentric relationship with its seat. In constructions wherein the pilot opening 38 extends through the housing member 4, there is provided a suitable threaded plug 39 for effecting a leak-proof seal to preclude leakage of fluid past the pilot.

It is to be understood that means other than those disclosed may be provided for manual actuation of the members 16 and 24, and that various other modifications and changes in structural details of the device may be made, within the scope of the appended claims, without departing from the spirit of the invention.

What is claimed is:

1. A valve having in combination a housing provided with ports and a tapered seat, a tapered apertured valve key for engagement with the tapered seat of the housing, a stem rotatable with and fixed relative to the valve key and extending through a portion of the housing, an abutment element normally fixed on the stem, a rotatable sleeve threaded onto the housing so as to be axially moved longitudinally of the upper end of the stem when rotated, said sleeve being rotatable into abutting relationship with the upper fixed element on the stem for moving said fixed element and stem, together with the valve key, to unseat the valve key, means for rotating the stem whereby to place the ports and apertures in communication, a collar for abutment with the sleeve and normally fixed about the stem for moving the valve key toward the seat on the housing upon predetermined rotational movement of the threaded sleeve, means for adjusting the collar to various positions along the stem and a stop integral with said collar for abutting the housing and limiting rotational movement of the valve key.

2. A valve having in combination a housing provided with ports and a tapered seat, a tapered apertured valve key for engagement with the tapered seat of the housing, a stem rotatable with and fixed relative to the valve key and extending through a portion of the housing, an abutment element normally fixed on the upper end of the stem, a rotatable sleeve threaded onto the housing so as to be axially moved longitudinally of the stem when rotated, said sleeve being rotatable into abutting relationship with the upper fixed element on the stem for moving said fixed element and stem together with the valve key, to unseat the valve key, means for rotating the stem whereby to place the ports and apertures in communication, and a combination stop and adjusting member movably secured to the stem in substantial contact with the sleeve and in position to strike the housing when rotated a predetermined amount.

ELMER R. NOLL.

CERTIFICATE OF CORRECTION.

Patent No. 2,001,035. May 14, 1935.

ELMER R. NOLL.

It is hereby certified that error appears in the printed specification of the above numbered patent requiring correction as follows: Page 2, second column, line 4-5, claim 1, strike out the words "upper end of the" and insert the same before the word "stem" in line 2, of said column; and that the said Letters Patent should be read with these corrections therein that the same may conform to the record of the case in the Patent Office.

Signed and sealed this 25th day of June, A. D. 1935.

(Seal)

Bryan M. Battey
Acting Commissioner of Patents.